United States Patent [19]
Van Gorkom et al.

[11] Patent Number: 5,625,253
[45] Date of Patent: Apr. 29, 1997

[54] FLAT-PANEL TYPE PICTURE DISPLAY DEVICE

[75] Inventors: Gerardus G. P. Van Gorkom; Siebe T. De Zwart; Petrus H. F. Trompenaars; Nicolaas Lambert, all of Eindhoven, Netherlands

[73] Assignee: U.S. Philips Corporation, New York, N.Y.

[21] Appl. No.: 303,555

[22] Filed: Sep. 8, 1994

Related U.S. Application Data

[63] Continuation of Ser. No. 23,520, Feb. 26, 1993, abandoned, which is a continuation-in-part of Ser. No. 830,951, Feb. 6, 1992, Pat. No. 5,313,136, which is a continuation of Ser. No. 528,677, May 24, 1990, abandoned, said Ser. No. 23,520, is a continuation-in-part of Ser. No. 954,949, Sep. 30, 1992, abandoned, which is a continuation of Ser. No. 637,039, Jan. 3, 1991, abandoned, which is a continuation-in-part of Ser. No. 528,677, said Ser. No. 23,520, is a continuation-in-part of Ser. No. 223,962, Jul. 17, 1992, abandoned, which is a continuation of Ser. No. 715,072, Jun. 13, 1991, abandoned.

[30] Foreign Application Priority Data

Mar. 12, 1992 [EP] European Pat. Off. ............... 92200709
Aug. 19, 1992 [EP] European Pat. Off. ............... 92202542

[51] Int. Cl.⁶ ................................................. H01J 29/70
[52] U.S. Cl. ..................... 313/422; 313/495; 313/361.1; 345/75
[58] Field of Search ...................... 313/315, 483, 313/361.1, 422, 495, 497; 345/74, 76, 75, 45, 47

[56] References Cited

U.S. PATENT DOCUMENTS

| | | | |
|---|---|---|---|
| 3,155,826 | 11/1964 | Peters | 313/361.1 |
| 3,911,514 | 10/1975 | Schulz et al. | 313/361.1 |
| 4,069,439 | 1/1978 | Anderson | 313/422 |
| 4,757,230 | 7/1988 | Washington et al. | 313/422 |
| 4,879,496 | 11/1989 | Knapp et al. | 313/422 |
| 4,881,005 | 11/1989 | Morimoto et al. | 313/422 |

FOREIGN PATENT DOCUMENTS

| | | |
|---|---|---|
| 0400750 | 12/1990 | European Pat. Off. . |
| 0436997 | 7/1991 | European Pat. Off. . |
| 0464937 | 1/1992 | European Pat. Off. . |

*Primary Examiner*—Ulysses Weldon
*Assistant Examiner*—Lun-Yi Lao
*Attorney, Agent, or Firm*—Robert J. Kraus

[57] ABSTRACT

A flat-panel type picture display device having a face plate with a luminescent screen at the inner side and, arranged at a short distance therefrom, a rear wall adjoined by a large number of electron transport ducts operating by means of wall interaction of electrons. A selection structure for withdrawing electrons from transport ducts and for directing them towards pixels on the luminescent screen comprises a preselection structure provided with preselection locations and a fine-selection plate provided with fine-selection apertures, each preselection location being associated with at least two fine-selection apertures. To improve contrast and/or color purity, an apertured obstruction plate forming chicanes in the electron paths is arranged between the preselection plate and the fine-selection plate.

14 Claims, 8 Drawing Sheets

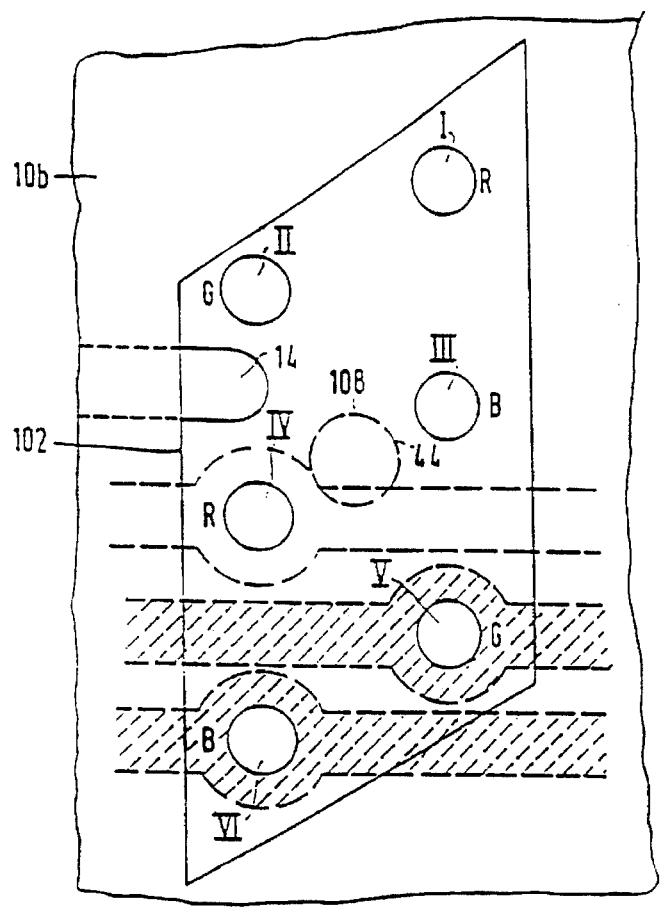
FIG.3
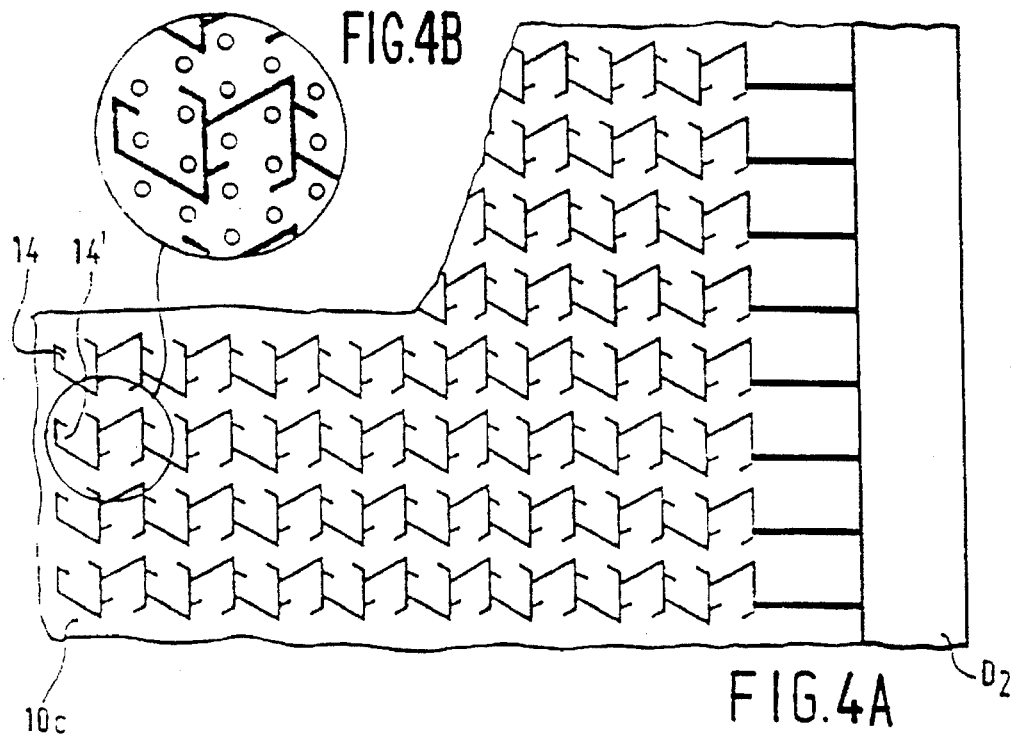
FIG.4B
FIG.4A

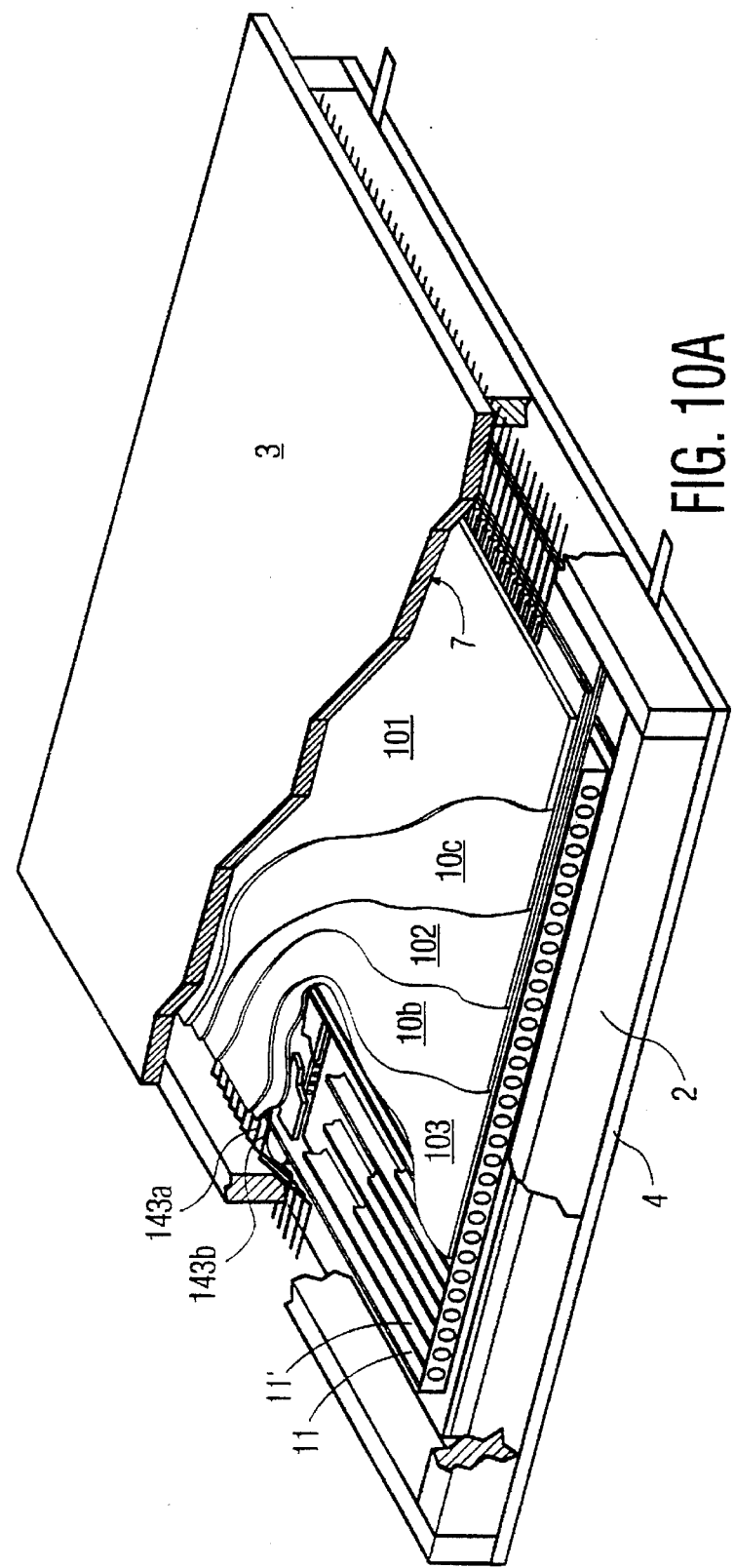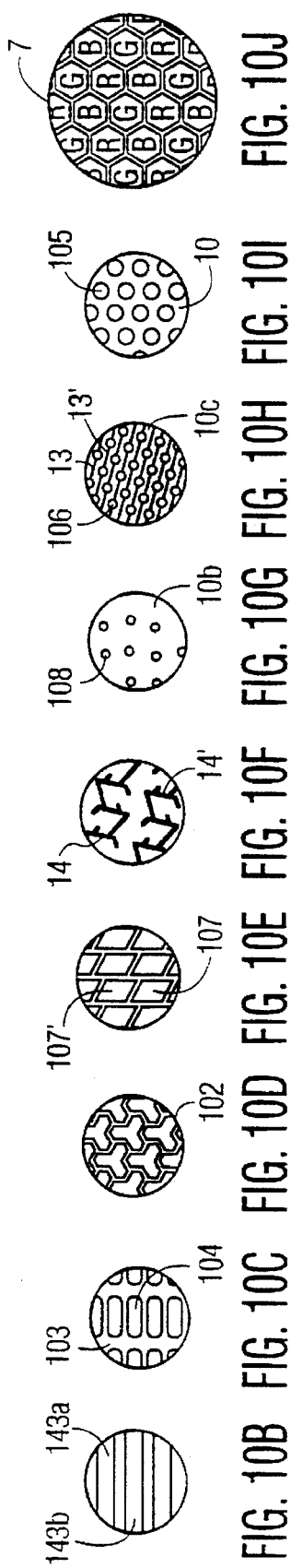

FLAT-PANEL TYPE PICTURE DISPLAY DEVICE

This application is a continuation of U.S. patent application Ser. No. 08/023,520 filed on 26 Feb. 1993, now abandoned, which is a continuation-in-part of:

U.S. patent application Ser. No. 07/830,951 filed on 6 Feb. 1992, now U.S. Pat. No. 5,313,136, which is a continuation of U.S. patent application Ser. No. 07/528,677 filed on 24 May 1990, now abandoned;

U.S. patent application Ser. No. 07/954,949 filed on 30 Sep. 1992, now abandoned, which is a continuation of U.S. patent application Ser. No. 07/637,039 filed on 3 Jan. 1991, now abandoned, which is a continuation-in-part of U.S. patent application Ser. No. 07/528,677 filed on 24 May 1990, now abandoned; and U.S. patent application Ser. No. 08/223,962 filed on 17 Jul. 1992, now abandoned which is a continuation of U.S. patent application Ser. No. 07/715,072 filed on 13 Jun. 1991, now abandoned.

BACKGROUND OF THE INVENTION

The invention relates to a picture display device having a vacuum envelope which is provided with a transparent face plate with a luminescent screen and with a rear wall, said display device comprising a plurality of juxtaposed sources for emitting electrons, a plurality of electron transport ducts cooperating with the sources and extending substantially parallel to the face plate for transporting electrons in the form of electron currents, and an active selection structure for withdrawing each electron current at predetermined locations from its transport duct and for directing said current towards desired pixels of the luminescent screen.

The display device described above is of the flat-panel type, as disclosed in EP-A-464 937. Display devices of the flat-panel type are devices having a transparent face plate and, arranged at a small distance therefrom, a rear plate, (which plates are interconnected by means of partitions) and in which the inner side of the face plate is provided with pixels in the form of a phosphor pattern, one side of which is provided with an electrically conductive coating (the combination generally being referred to as luminescent screen). If (video information-controlled) electrons impinge upon the luminescent screen, a visual image is formed which is visible via the front side of the face plate. The face plate may be flat or, if desired, curved (for example, spherical or cylindrical).

The display device described in EP-A-464 937 comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents and (colour) selection means comprising selectively energizable electrodes (selection electrodes) for withdrawing each electron current from its transport duct at predetermined extraction locations facing the luminescent screen, further means being provided for directing extracted electrons towards pixels of the luminescent screen for producing a picture composed of pixels.

The operation of the picture display device disclosed in EP-A-464 937 is based on the recognition that electron transport is possible when electrons impinge on an inner wall of an elongate evacuated cavity (referred to as "compartment") defined by walls of a high-ohmic, electrically substantially insulating material (for example, glass or synthetic material), if an electric field of sufficient power is generated in the longitudinal direction of the "compartment" (by applying a potential difference across the ends of the "compartment"). The impinging electrons then generate secondary electrons by wall interaction, which electrons are attracted to a further wall section and in their turn generate secondary electrons again by wall interaction. The circumstances (field strength E, electrical resistance of the walls, secondary emission coefficient $\delta$ of the walls) may be chosen to be such that a constant vacuum current will flow in the "compartment".

Starting from the above-mentioned principle, a flat-panel picture display device can be realised by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By adding selection electrodes arranged in rows to the arrangement of apertures, which selection electrodes are energizable by means of a first (positive) electric voltage (pulse) for withdrawing electron currents from the "compartments" via the apertures of a row, or which are energizable by means of a second (lower) electric voltage if no electrons are to be locally withdrawn from the "compartments", an addressing means is provided with which electrons withdrawn from the "compartments" can be directed (and accelerated) towards the screen for producing a picture composed of pixels by activating the pixels.

EP-A-464 937 describes a stepped active selection system comprising a preselection structure, a distribution duct structure and a fine-selection structure. A stepped selection system using a number of preselection extraction locations which is reduced with respect to the number of pixels, and an associated number of (fine) selection apertures which corresponds to the number of pixels provides advantages with respect to, for example, the extraction efficiency and/or the required number of electrical connections/drivers.

However, a drawback of the structure known from EPA-464 937 is that direct hits may occur. This means that there are electrons which are directly incident on non-selected fine-selection apertures. This is detrimental to colour purity and contrast.

SUMMARY OF THE INVENTION

It is an object of the invention to provide a display device of the type described in the opening paragraph in which the occurrence of direct hits is substantially reduced.

To this end the display device according to the invention is characterized in that the active selection structure comprises a preselection structure having extraction locations which can be activated and communicate row by row with the transport ducts and a selection plate having apertures which can be activated and are each associated with a pixel, and in that an apertured obstruction plate is arranged between the preselection structure and the selection plate, each aperture of the obstruction plate communicating with an activatable extraction location of the preselection structure and at least two activatable apertures of the selection plate.

In order to prevent electrons in the stepped twofold, threefold or multifold selection system from directly passing straight from the preselection structure, or even from the rear wall through apertures in the selection plate towards the luminescent screen (referred to as direct hits), an apertured auxiliary or obstruction plate is arranged, according to the invention, between the preselection structure and the selection plate. This obstruction plate particularly has one aperture for each extraction location. It is a feature of the obstruction plate according to the invention that the aperture sizes and the distance to the selection plate are chosen in such a way that an electron moving from an electron transport duct towards the display screen must always impinge on a wall (for example, a surface of the obstruction plate, a surface of an aperture in the obstruction plate, or a surface of the selection plate). In this way it can be ensured that direct hits are no longer possible. As it were, the obstruction plate forms "chicanes" or obstacles in the electron paths.

It is thereby achieved that the advantages provided by the use of a stepped selection system are not at the expense of colour purity and contrast.

The obstruction plate may entirely fill the space between the preselection structure and the selection plate. The apertures in the plate are then preferably formed in such a way that their entrance portions each correspond to one extraction location each and their exit portions each correspond to one selection aperture associated with this extraction location, preferably in such a way that only a blind part of the selection plate can be seen from each entrance aperture.

Alternatively, the obstruction plate may be spaced apart from the preselection structure and the selection plate at both sides by aperture spacer plates. The apertures in the obstruction plate then constitute constrictions in the paths between the extraction locations and the associated selection apertures. The projection on the selection plate of each aperture in the obstruction plate is then situated preferably between the selection apertures associated therewith.

The use of an obstruction plate has further advantages, as described below for three different cases:

(a) It is possible to give all fine-selection electrodes the same DC bias voltage (DC interconnection). The acceleration voltage which is required to attract the electrons towards the screen may thus be constant throughout the height of the screen or vary to a small extent only. A desired fine-selection electrode is selected by giving this electrode an AC pulse. A further advantage is that the orientation of the fine-selection tracks can be freely chosen, for example, vertically instead of horizontally, or "obliquely".

(b) It is possible to give all corresponding fine-selection electrodes (for example all "red", all "green" and all "blue" electrodes) the same DC bias voltage so that only three AC driver circuits are sufficient for the fine selection.

(c) It is possible to divide the fine-selection electrodes and the "red", "green" and "blue" selection electrodes into a limited number of groups and to give each group the same DC bias voltage and AC drive.

A good contrast can particularly be realised if the obstruction plate is spaced apart from the selection plate by an apertured spacer plate, each aperture of the spacer plate associating an aperture of the auxiliary plate with at least two activatable apertures in the selection plate, while (dummy) electrodes are arranged along the electron paths between the apertures in the obstruction plate and the apertures in the selection plate, said (dummy) electrodes being preferably connected to a circuit for applying, in operation, a higher DC voltage to these electrodes than to the non-selected selection electrodes. (The dummy electrodes may be arranged either on the auxiliary plate, or on the walls of the apertures in the auxiliary plate or on the selection plate.)

It is thereby achieved that unwanted electrons which have leaked out of the transport ducts are collected by the dummy electrodes so that they cannot reach the luminescent screen, thus obtaining a better black level and hence a better contrast.

In all these cases it is advantageous if the space between the preselection plate and the selection plate is continuously "in the forward or transport mode" in operation. To this end the selection electrodes are connected to a circuit for applying, in operation, a higher DC voltage to these electrodes than to the preselection electrodes. Without this measure there is the risk of the space charging negatively, whereafter transport is no longer possible. Restarting transport is difficult, because negative charges are difficult to remove.

When dummy electrodes are used in combination with an obstruction plate: in case (a), described above, all dummy electrodes may be DC interconnected and need not be AC driven, in case (b) described above, all dummy electrodes may be DC interconnected and AC driven separately; in case (c) described above, the dummy electrodes may be DC interconnected and AC driven per group.

These measures considerably reduce the number of drivers (drive circuits) and coupling capacitors.

BRIEF DESCRIPTION OF THE DRAWING

These and other aspects of the invention will be described in greater detail with reference to the following drawing figures and the embodiments described hereinafter, using identical reference numerals for the same components:

FIG. 3 illustrates the operation of the active colour selection structure;

FIG. 4 is an elevational view of a fine-selection plate with dummy electrodes;

FIG. 10 shows an embodiment of a display device based on the principle of the structure shown in FIG. 1;

DESCRIPTION OF THE PREFERRED EMBODIMENTS

Figure 1:
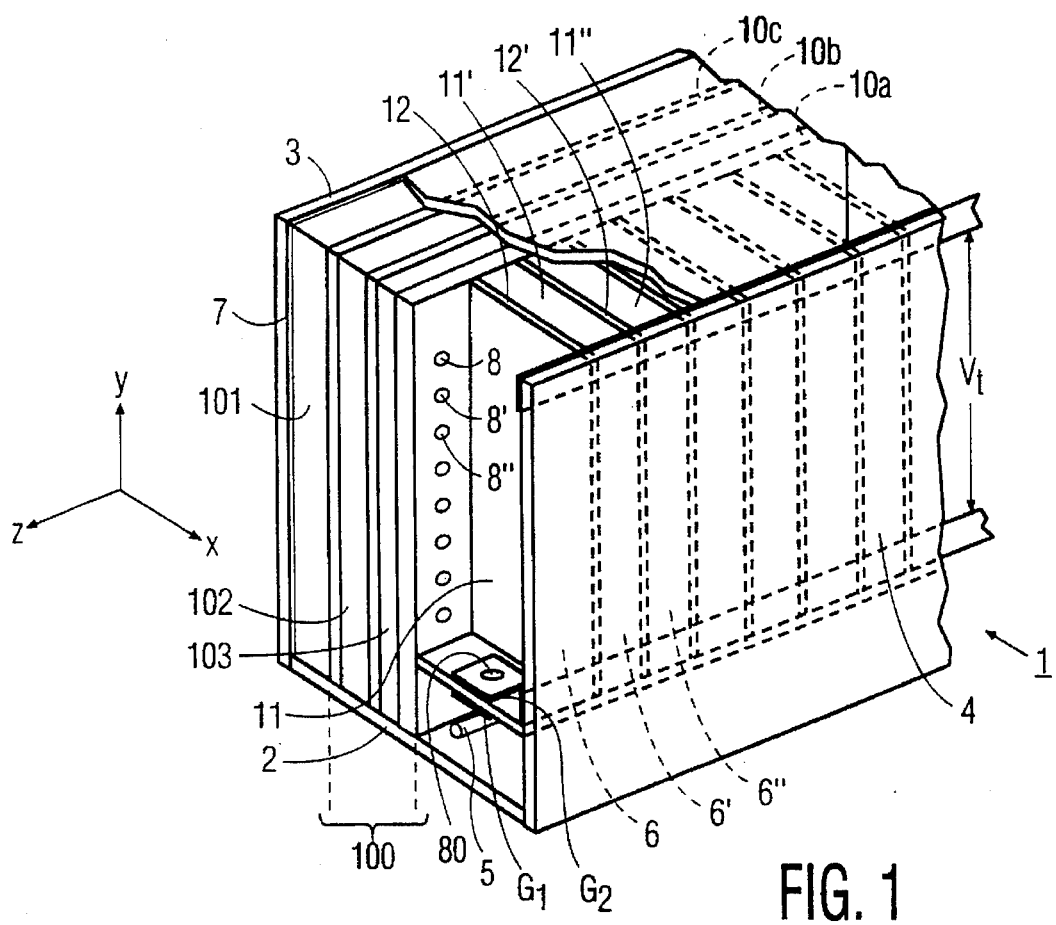
FIG. 1 is a diagrammatic perspective elevational view, partly broken away, of a part of a colour display device according to the invention with electron ducts and an active (colour) selection structure comprising an apertured preselection plate and an aperture fine-selection plate whose components are not shown to scale.

FIG. 1 shows a flat-panel picture display device having a display panel (window) 3 and a rear wall 4 located opposite the display panel. A luminescent screen 7 having a repetitive pattern (rows or dots) of triplets of red (R), green (G) and blue (B) luminescing phosphor elements is arranged on the inner surface of window 3. In a practical embodiment the (dot-shaped) phosphor elements of a triplet are located at the vertices of a triangle.

An electron source arrangement 5, for example a line cathode which by means of drive electrodes provides a large number, for example 600, of electron emitters or a similar number of separate emitters, is arranged proximate to a wall 2 which interconnects the display panel 3 and rear wall 4. Each of these emitters is to provide a relatively small current so that many types of cathodes (cold or hot cathodes) are suitable as emitters. The emitters may be driven by a video drive circuit. The electron source arrangement 5 is arranged opposite entrance apertures of a row of electron transport ducts extending substantially parallel to the screen, which ducts are constituted by compartments 6, 6', 6", . . . , etc., in this case one compartment for each electron source. These compartments have cavities 11, 11', 11", . . . defined by the rear wall 4 and partitions 12, 12', . . . . The cavities 11, 11', . . . may alternatively be provided in the rear wall 4 itself. At least one wall (preferably the rear wall) of each compartment should have a high electrical resistance which is suitable for the purpose of the invention in at least the transport direction (suitable materials are, for example, ceramic material, glass, synthetic material—coated or uncoated) and should have a secondary emission coefficient $\delta > 1$ over a given range of primary electron energies. An axial transport field is generated in the compartments by applying a potential difference $V_t$ across the height of the compartments 6, 6', 6", . . . .

The electrical resistance of the wall material has such a value that a minimum possible total amount of current (preferably less than, for example, 10 mA) will flow in the walls in the case of a field strength in the axial direction in the compartments on the order of one hundred to several hundred Volts per cm required for the electron transport. By applying a voltage on the order of several dozen to several hundred Volts (value of the voltage is dependent on circumstances) between the row 5 of electron sources and the compartments 6, 6', 6", electrons are accelerated from the electron sources towards the compartments, whereafter they impinge upon the walls in the compartments and generate secondary electrons.

The invention utilizes the aspect disclosed in EP-A-400 750 and EP-A-436 997 that vacuum electron transport within compartments having walls of high-ohmic electrically substantially insulating material is possible if an electric field of sufficient power is applied in the longitudinal direction of the compartment. The contents of EP-A-400 750 and EP-A-436 997 are herein incorporated by reference.

Figure 2:
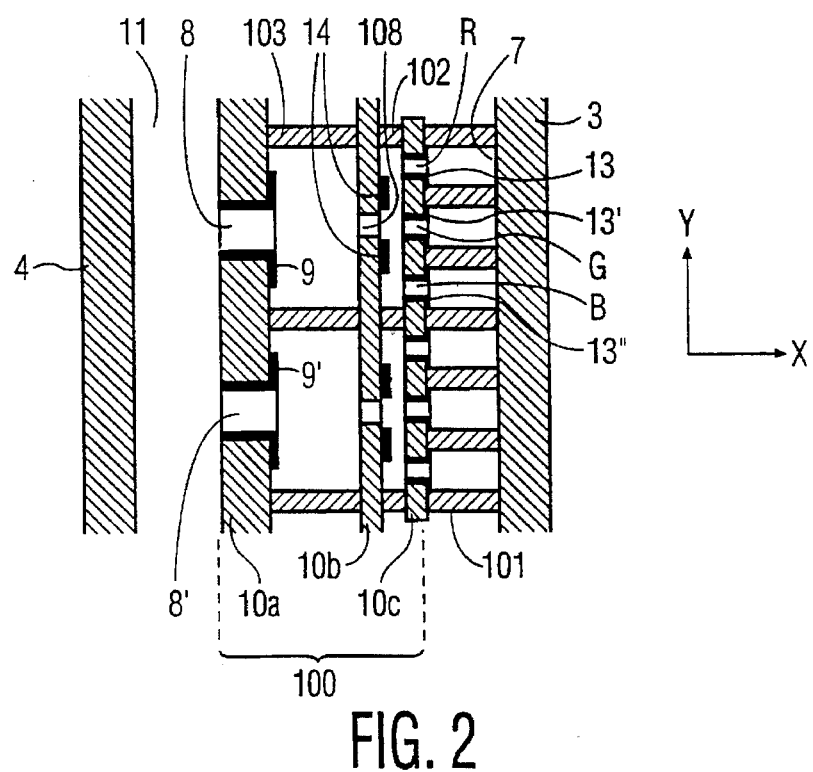
FIG. 2 is a cross-section through a part of a device of the type shown in FIG. 1.

The space between the compartments and the luminescent screen 7, which is arranged on the inner wall of display panel 3, accommodates an active colour selection system 100 which comprises an (active) preselection structure (in this case a preselection plate) 10a, a (passive) obstruction plate 10b and an (active) selection structure (in this case a (fine-) selection plate) 10c (see also FIG. 2). The colour selection system 100 is separated from the luminescent screen 7 by a flu-spacer structure 101, for example an apertured plate of electrically insulating material.

FIG. 2 shows in a diagrammatical cross-section a pan of the display device of FIG. 1 in greater detail, particularly the active colour selection system 100 which comprises a preselection plate 10a with apertures 8, 8', 8", . . . and a obstruction plate 10b with groups of apertures R, G, B. One by three or two by three fine-selection apertures R, G, B are associated with each preselection aperture 8, 8', etc. Other numbers are alternatively possible. (In the diagrammatic FIG. 2 the apertures R, G, B are in alignment, with aperture G fight opposite aperture 108 in plate 10b. However, in practice they will generally not be aligned, but arranged, for example in a triangular configuration (see, for example FIG. 3) in such a way that the apertures 108 in the obstruction plate 10b are located opposite a blind pan, i.e. not opposite an aperture, of the fine-selection plate 10c. The obstruction plate 10b having apertures 108 arranged between the preselection plate 10a and the fine-selection plate 10c forms "chicanes" in the electron paths.

Electron transport ducts 6 with transport cavities 11, 11', . . . are formed between the structure 100 and rear wall 4. To be able to draw electrons from the transport ducts 6 via the apertures 8, 8', . . . , pierced metal preselection electrodes 9, 9', etc. are arranged on the plate 10a.

The walls of the apertures 8, 8', . . . may be metallized. Preferably there is no or little electrode metal on the surface of plate 10a on the side where the electrons land so as to ensure that no electrons remain on a selection electrode during addressing (i.e. the electrode must not draw current).

Another solution to the problem of drawing current is to ensure that there is electrode metal on the selection plate surface where the electrons land, but this metal should then be given such a large secondary emission coefficient that the preselection electrodes do not draw any net current.

Similar to the plate 10a, the fine-selection plate 10c is provided with addressable rows of (fine-) selection electrodes for realising fine selection. The possibility of capacitively interconnecting corresponding rows of fine-selection electrodes (via coupling capacitors: referred to as AC interconnection) is important in this respect. In fact, a preselection has already taken place and, in principle, electrons cannot land at the wrong location. This means that only one group, or a small number of groups of three separately formed fine-selection electrodes is required for this mode of fine selection. For example, the drive is effected as follows, but there are also other possibilities.

Figure 14:
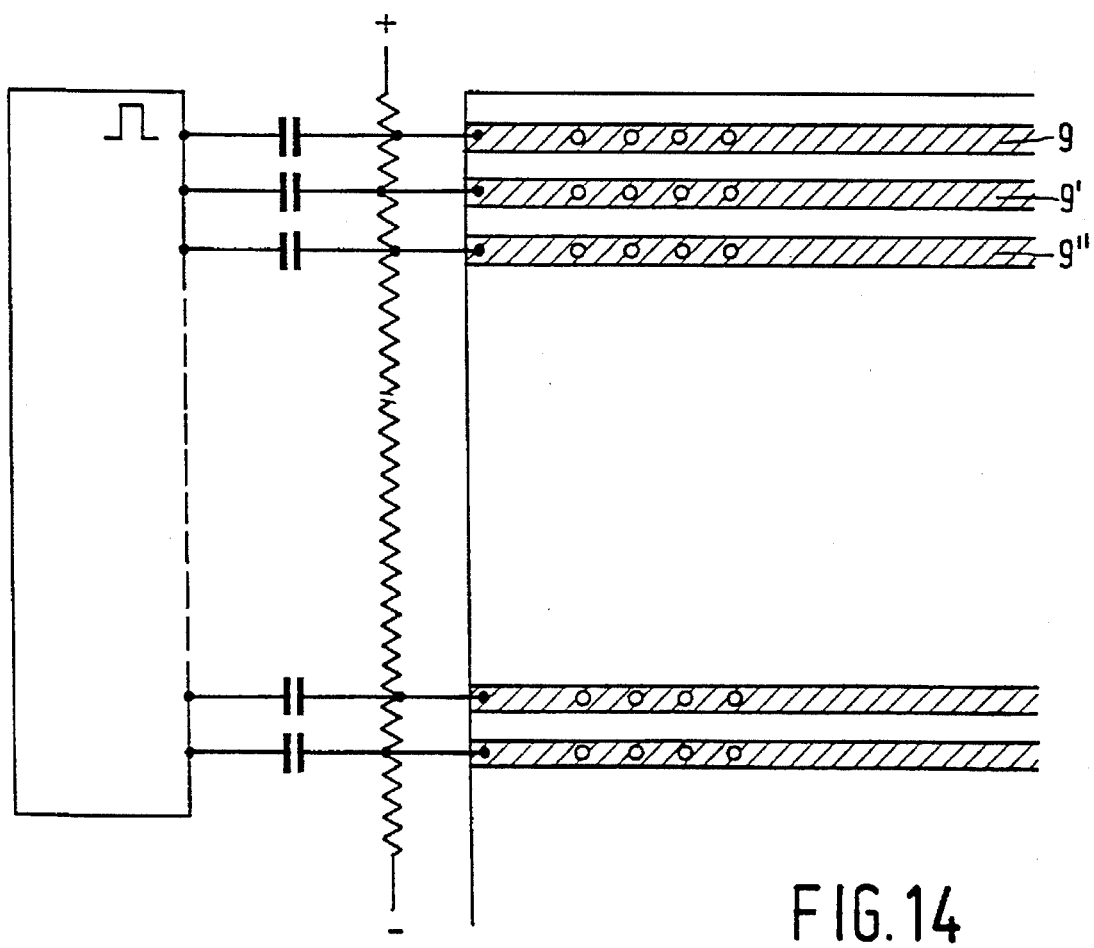
FIG. 14 shows diagrammatically a circuit for driving preselection electrodes.

The rows of preselection electrodes are subjected to a linearly increasing DC voltage by connecting them to voltage-dividing resistors (see FIG. 14). These voltage-dividing resistors may be arranged at the rim of the preselection plate, in vacuo. The voltage-dividing resistors are connected to a voltage source in such a way that the preselection electrodes receive the correct potential to realise electron transport in the ducts. Due to the presence of the auxiliary or obstruction plate 10b, the rows of fine-selection electrodes can be subjected to the same bias voltage, in one group or in a number of groups.

Let it be assumed that the (double) colour selection system comprises 3 fine-selection electrodes for each preselection electrode. Then a pulse of, for example, 250 V is applied to a preselection electrode for 60 μs and pulses of, for example 200 V are applied to the desired fine-selection electrodes for 20 μs. Subsequently, the same procedure is carried out for the next electrodes, etc. It should of course be ensured that the line selection pulses are in synchronism with the video information. The video information is applied, for example, to the $G_1$ electrodes (see FIG. 1) in the form of a time (or amplitude)-modulated signal.

To ensure that none or a negligibly small number of the electrons land at the wrong location, which would be at the expense of contrast and colour purity, the apertured auxiliary or obstruction plate 10b of electrically insulating material is arranged between the preselection plate 10a and the (fine-)selection plate 10c. Each aperture 108 in the obstruction plate 10b corresponds to an aperture in the preselection plate 10a (FIG. 2).

The size of the apertures in this obstruction plate (for example 0.35 mm) and the distance between the obstruction plate and the fine-selection plate (for example 0.25 mm) are chosen to be such that the electrons cannot or cannot substantially reach the apertures in the fine-selection plate straight from the preselection apertures. A great advantage is that, in principle, a great many, if not all, fine-selection electrodes can be interconnected per group (for example per colour), which is referred to as DC interconnection (see FIG. 4). The reason is that the rim of each aperture in the obstruction plate approximately assumes the potential of the oppositely located part of the fine- selection plate.

However, this means that the entire transport voltage (plus the voltage required for free selection in the transport mode) is present at one side of the display over the distance between the preselection plate and obstruction plate; therefore, this distance should not be chosen to be too small and is preferably larger than approximately 0.4 mm.

DC interconnection of all fine-selection electrodes has the additional advantage that the post-acceleration voltage to the luminescent screen is the same throughout the display, thus precluding any variation in brightness in the direction of the transport ducts. This is particularly important in large displays in which the cathodes are preferably arranged centrally. A possible cause of the occurrence of partial images is thereby eliminated.

A further improvement can be achieved by associating a dummy electrode 14, 14', . . . with each aperture 108 in the plate 10b in the space between the plate 10b and the plate 10c. These dummy electrodes, which may be arranged, for example, on the plate 10b or on the plate 10c and may be, for example strip-shaped and connected row by row to a voltage source D2 (FIG. 4), ensure that unwanted electrons which still pass the plate 10b (referred to as "high hop" electrons) are collected so that they cannot reach the luminescent screen. To realise this, it is advantageous to ensure that the (horizontal) ducts formed between the preselection plate and the fine-selection plate are always in the transport mode by giving the fine-selection electrodes and the dummy electrodes a positive voltage with respect to the preselection electrodes. The dummy electrodes of the non-addressed colour pixels are brought to a higher voltage than the adjacent fine-selection electrodes. This improves contrast because "high hop" electrons cannot reach the luminescent screen but are collected by the dummy electrodes. When a colour pixel is being addressed, the respective fine-selection electrode is brought to a higher voltage than the dummy electrode.

Since only a few (for example, 3 or 6) connections and coupling capacitors are required for the fine selection in this way, it is possible to increase the value of the pulses at these electrodes to, for example, 400 V. This provides another advantage. All the dummy electrodes may then carry one potential, for example, 100 V above the DC voltage of the fine-selection electrodes. This means that the assembly of dummy electrodes may be formed, for example, as a metal spacer, which may be constructively attractive. Otherwise, the option remains that such high-value pulses are not applied to the fine-selection electrode, but then the dummy electrodes have to be driven separately (the number of dummy electrodes is equal to the number of coarse-selection electrodes or half this number) and should be given negative pulses.

Figure 15:
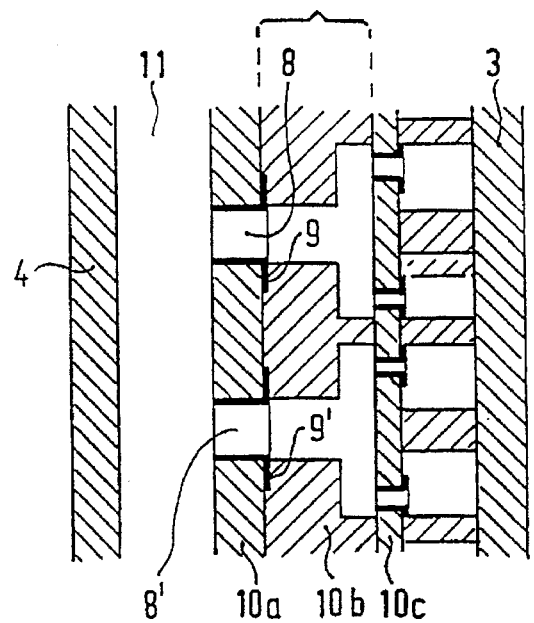
FIG. 15 is a cross-section of an alternative embodiment of a display device of the type shown in FIG. 1.

It is to be noted that modifications of the structure with the obstruction plate 10b as shown in FIG. 2 are possible. For example, the plate 10b may be combined with one or both spacer plates 102, 103 (see FIG. 15).

Figure 5:
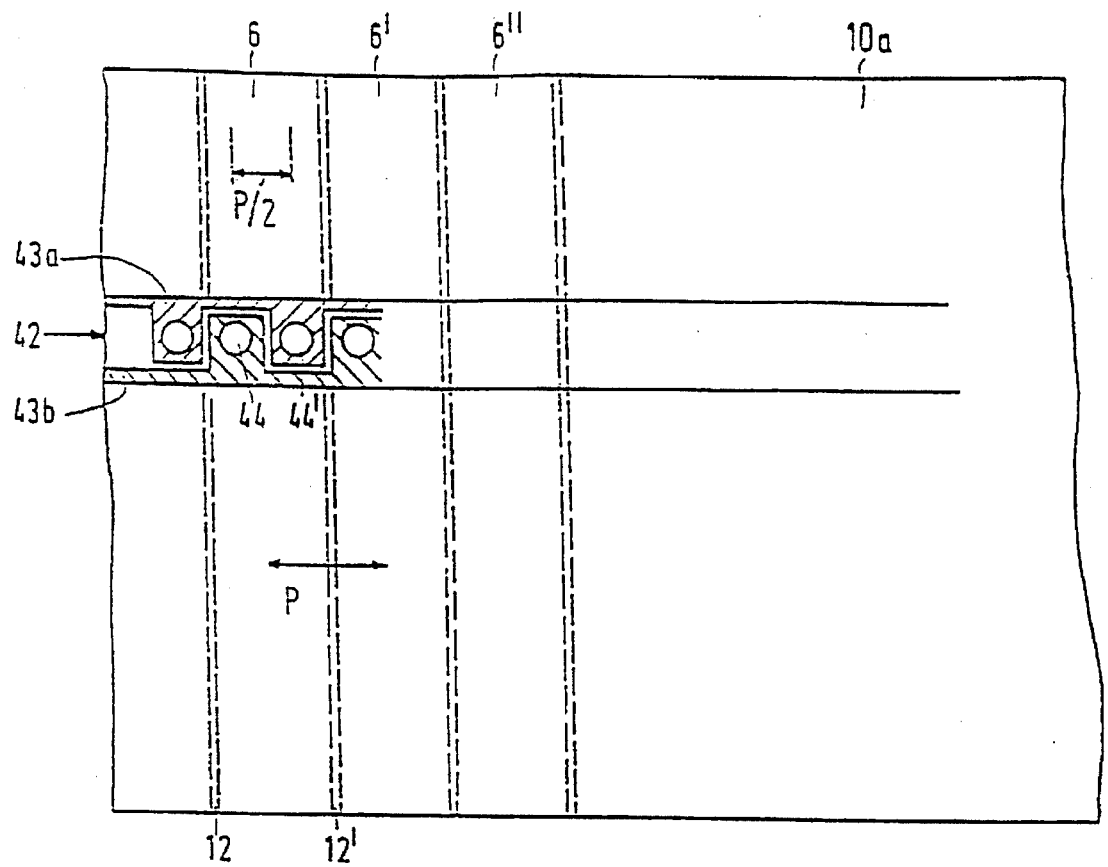
FIG. 5 is an elevational view of an embodiment of a preselection plate.
Figure 6:
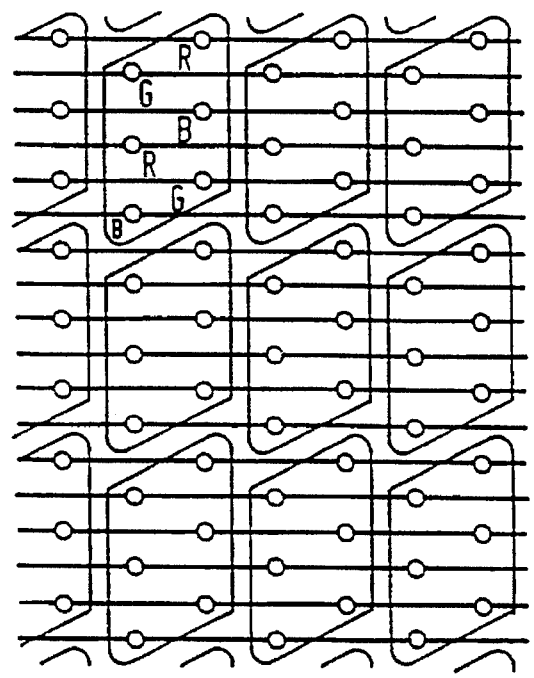
FIGS. 6, 7, 8 and 9 show different geometries of fine-selection apertures and fine-selection electrodes.

FIG. 5 shows the case where two preselection apertures for each extraction location with a pitch of (p/2) are provided in each row of preselection electrodes. Each preselection electrode 42 is divided into two aperture sub-electrodes 43a and 43b in the manner shown, which simplifies contacting. In this way the horizontal resolution can be doubled, with, for example, the width of the transport ducts remaining the same and without having to change the mode of operating the transport ducts 6, 6', 6", . . . (each cooperating with one electron emitter). A number of fine-selection apertures in a fine-selection plate for selecting the colours red (R), green (G) and blue (B) is associated with each preselection aperture 44, 44', . . . , for example, as is shown in FIG. 6. The system described can be operated in the "multiplex" mode. This means that, for example 2×3 pixels can be consecutively driven (multiplexed) in one line period by means of one electron emitter. Other multiplex schemes are alternatively possible.

An alternative possibility is to make the transport duct width twice as large while the horizontal pixel pitch remains the same. Its advantages are:

the transport voltage is a factor of 2 lower, the number of cathodes, or rather $g_1$ sections, is also twice as small.

In both cases use can be made of a multi(bi)plex preselection plate: an insulating plate with a double row of apertures, one for the left side and one for the right side of the duct, whose rear side is provided with suitable metal tracks, while the inner side of the apertures is also metallized.

The system of FIG. 5 operates optimally when driven statically, but it has been found that, in the case of dynamic drive, negative charges may be left at the duct side of the preselection plate after the falling edge of the selection pulse. This effect particularly occurs at the rear side of the "blind" pieces of metal track which connect all left and right preselection apertures horizontally to each other. Such negative charge effects may cause a vertical smear which is also scene-dependent.

The following provides a solution to this problem, although it should be noted that, in the disclosed embodiment, this solution is only satisfactory in combination with the obstruction plate. The essence is that the layout of the coarse-selection plate is chosen to be such that the left/right selection is realised by energizing subjacent metal tracks. This means that there are no "blind" pieces of metallization so that negative charges left in the ducts are entirely or substantially entirely avoided.

Figure 11:
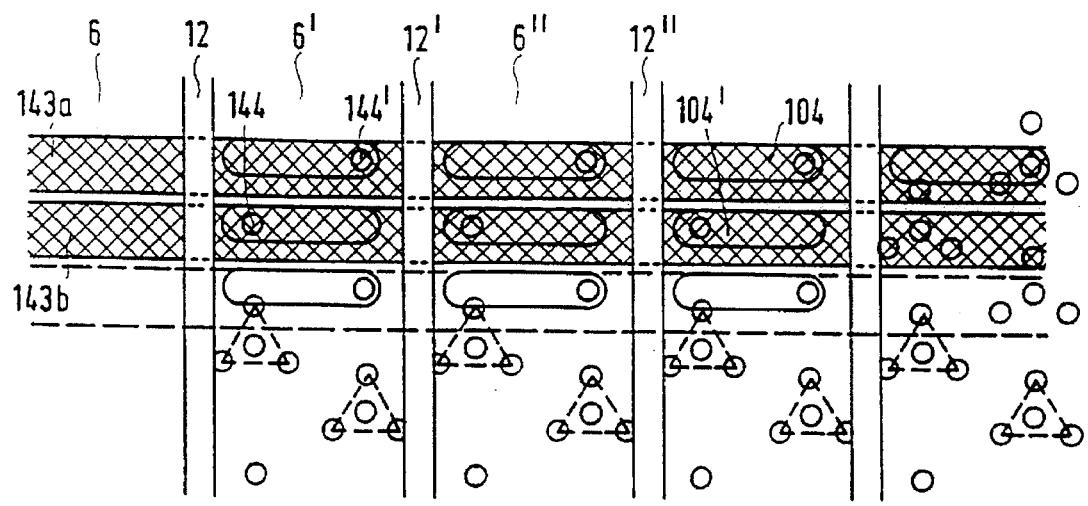
FIGS. 11 and 12 show alternatives to the structure shown in FIG. 5.

Possible embodiments:

(a) There is no preselection plate. The preselection strips comprise gauze strips 143a, 143b arranged on a spacer of insulating material provided with transverse grooves, followed by the obstruction plate with apertures 144, 144' which are eccentric with respect to the centres of the ducts, see FIG. 11. The preselection is performed throughout the column width. This is possible due to the use of the obstruction plate. The left/right selection is effected below each other, which is possible because the respective obstruction plate apertures are offset by half a pixel pitch with respect to each other. A spacer plate having apertures 104, 104', . . . is arranged behind the obstruction plate so as to associate each obstruction aperture with a set of fine-selection apertures. These sets are shown in a configuration of "horizontally" oriented triangles in FIG. 11.

Figure 12:
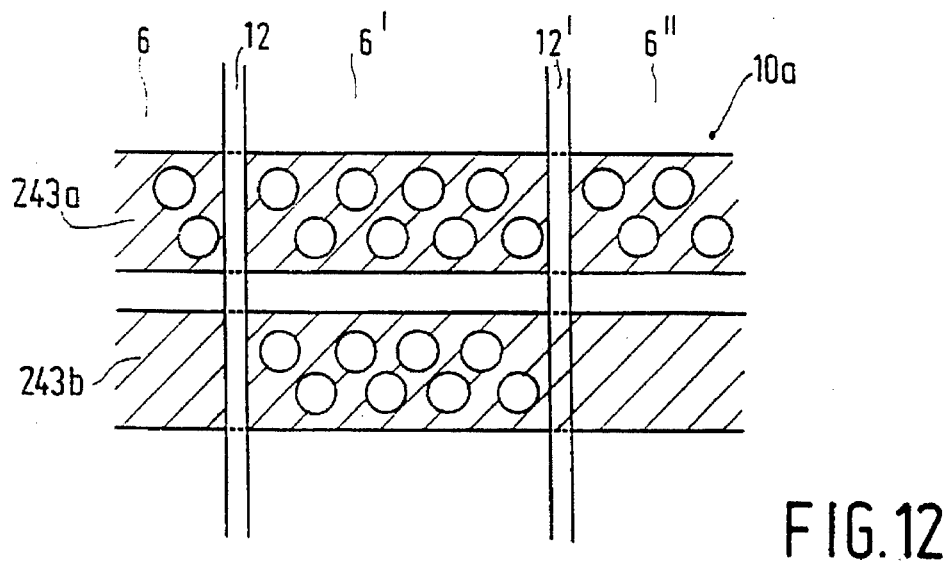

(b) The preselection plate is provided with continuous horizontal metal tracks 243a, 243b having (substantially) the same dimensions as the gauze strips mentioned under a) in which a large number of apertures is provided whose inner sides are metallized, see FIG. 12. Also in this case there are no "blind" tracks. The large number of apemares further ensures that the electrons drawn to an addressed strip and hitting the insulator only need to cover a very small distance to reach one of the apertures. As a result, the quantity of negative charge left after switching off is so small that the picture quality is not affected. The rest of the display is the same as in the first-mentioned case.

Advantages of the first embodiment (described in paragraph (a) above) are: the essential absence of negative charge and the fact that a thin, fragile selection plate with metal tracks can be replaced by gauze strips which are not very vulnerable, in combination with an adaptation of the apertures in the first spacer plate. Advantages of the second embodiment (described in paragraph (b) above) are drawing less current and a better primary contrast.

In the first embodiment, drawing current can be reduced by providing a thin insulating layer at the duct side of the gauze strips (for example, by unilateral anodizing or via vapour deposition or sputtering of an insulator).

In the foregoing it has been tacifiy assumed that the electric connection tracks of the fine-selection electrodes are horizontally (or substantially horizontally) oriented in connection with the (vertical) transport voltage across the preselection electrodes. Due to the introduction of the obstruction plate the transport voltage is decoupled from the dummy and fine-selection electrodes. Hence, in addition to interconnection possibilities (reduction of the number of contacts and drivers), there are now also extra possibilities for the orientation of the connections between the electrodes. It is possible, for example, to provide the connection tracks vertically or at a given angle. This also provides the simple possibility of choosing a different orientation of the delta structure of phosphor dots and of choosing different multiplex drive modes.

FIGS. 6, 7, 8 and 9 show a number of embodiments, each having addressing blocks of 6 fine-selection apertures. The fine-selection apertures, associated phosphor colours (R, G, B), fine-selection connection tracks and the circumference of the addressing blocks are shown. The preselection tracks associated with the addressing blocks are assumed to be horizontal (or horizontal with a slightly wavy pattern).

FIG. 6 shows the structure in conjunction with FIG. 3. The transport ducts comprise two multiplexed columns with sixfold addressing blocks in a "vertical" parallelogram shape. All coarse, fine (and dummy) connection tracks are oriented horizontally.

Figure 7:
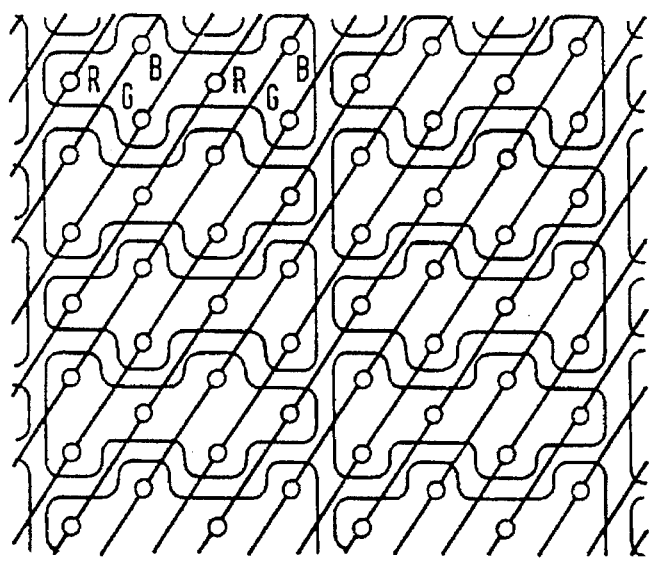

FIG. 7 shows an embodiment in which the free connection tracks extend at an angle of 60° to the horizontal and in which the addressing blocks have a different shape and are oriented horizontally. Column multiplexing is now entirely realised via the fine-selection electrodes, while the coarse-selection electrodes only address the lines. A drawback is the different shape of the addressing blocks, causing the fine selection to proceed with greater difficulty.

Figure 8:
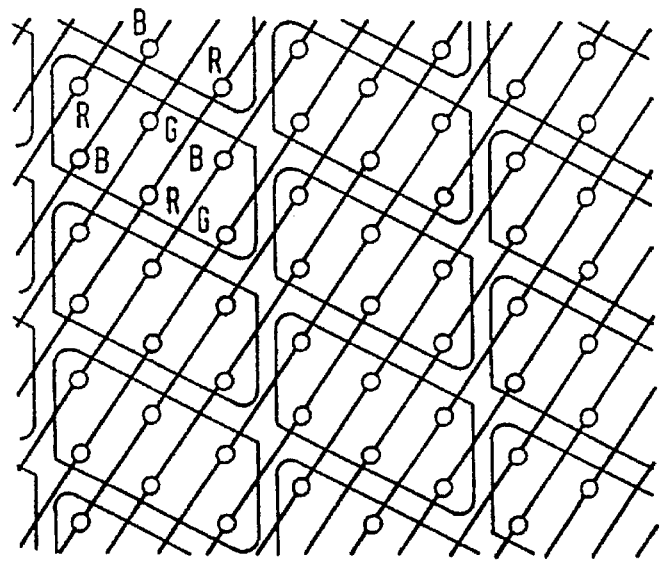

In FIG. 8 the fine connection tracks again extend at an angle of 60° to the horizontal, but this time the addressing blocks are parallelogram-shaped. As can be seen, the addressing blocks are not situated in a column or a row and the preselection will have to be performed in a slightly wavy line and involved in the "colour" selection. Moreover, the transport duct width is not equal to 2 triads, as in FIGS. 6 and 7.

Figure 9:
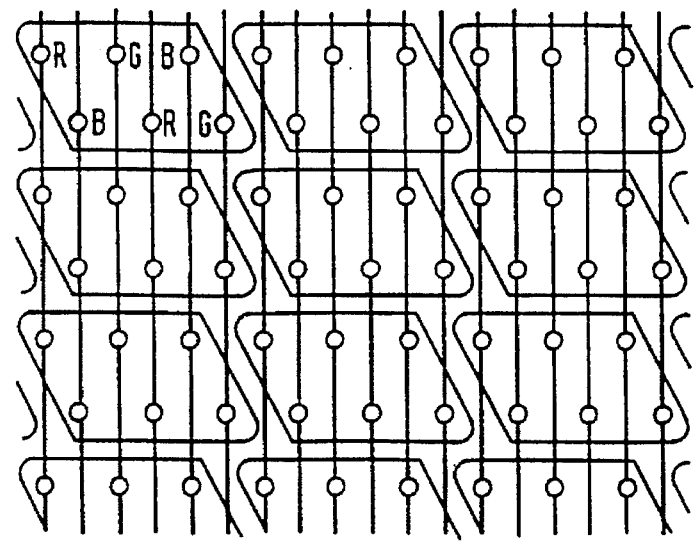

In FIG. 9 the addressing blocks, fine selection and also the phosphor pattern are rotated a quarter turn with respect to FIG. 6. The phosphor pattern is now oriented in the same way as in the conventional colour monitors using a delta structure. It should be noted that the pixel height/width ratio is different than in the other Figures. Thus, this also has consequences for the transport duct width, etc.

These are not all the possibilities: other track patterns such as, for example a wave, star or block pattern may alternatively be used. The addressing blocks may have a different shape and a configuration different from the sixfold configuration; there is wide choice of multiplex and interconnection modes, etc.

All these considerations also apply to the connection tracks of the dummy electrodes.

Figure 13:
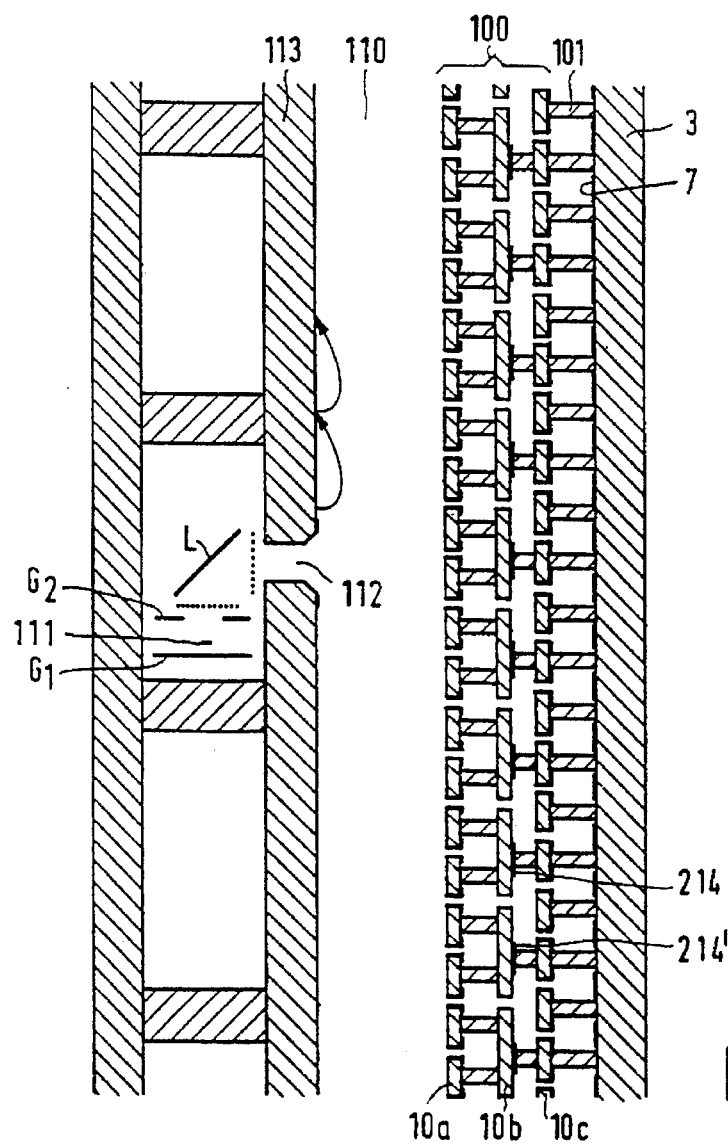
FIG. 13 is a cross-section of an embodiment of a display device in the area proximate to the entrance portion of an electron transport duct.

FIG. 13 shows diagrammatically an entrance portion of an electron transport duct 110 and its vicinity, with electron injection via an aperture in a wall of the duct. This is an alternative to the structure shown in FIG. 1 in which the electrons are injected through entrance apertures 80 in the bottom of the transport ducts 11, 11', . . . .The structure shown in FIG. 13 is characterized in that the electrons emitted by the cathode wire 111 are injected through an entrance aperture 112 in a wall 113 of the transport duct 110 via an oblique entrance plate L, where they can realize an upward or downward current via the wall interaction mechanism, dependent on the direction of the applied transport field. A $G_1$ electrode is associated with each entrance aperture 112, which electrode is connected to video signal-controlled means for controlling the electron injection (for which a voltage swing of several dozen Volts is required), while a $G_2$ electrode is also added (possibly to all entrance apertures combined), with which electrode, inter alia the entrance energy of the electrons which are being injected can be controlled. In this type of structure the entrance apertures of the transport ducts may be arranged in the preselection plate or, as shown, in the rear wall 114 of the transport ducts. In the latter case they may be arranged, for example in the middle between the "upper" and "lower" sides. The latter is advantageous, particularly when larger display formats are used. Electrons are withdrawn from the transport ducts 110 by means of the addressable, stepped, twofold selection structure 100 with preselection means 10a and fine-selection means 10c and directed towards desired pixels of the luminescent screen 7 provided on a transparent face plate.

FIG. 10 shows in a more illustrative way the structure of a thin flat-panel display according to the invention. The Figure shows a box-shaped structure with a transparent face plate 3 whose inner side is provided with a luminescent phosphor screen 7, and a rear wall 4. They are connected by partitions 2, etc. at their circumference. A spacer plate 101 having apertures 105 is adjacent to the luminescent screen 7. This plate is followed by a fine-selection plate 10c having fine-selection apertures 106 and a pattern of fine-selection electrodes 13, 13' extending from aperture to aperture and surrounding the apertures on its screen-sided surface. An important component is the obstruction plate 10b provided with a pattern of small apertures (108), which obstruction plate is spaced apart from the fine-selection plate 10c by a spacer plate 102. Obstruction plate 10b ensures that electrons withdrawn from the transport ducts always impinge at least once on a wall before they are drawn through the fine-selection apertures. In this case, as shown in inset A, spacer plate 102 has parallelogram-shaped apertures 107, 107' . . . to associate each aperture 108 in the obstruction plate 10b with a plurality (for example, 4 or 6) of fine-selection apertures 106. Cf., for example, FIG. 3. In an alternative embodiment the apertures in the spacer plate 102 may have a triangular basic shape so as to associate each aperture 108 with, for example, 3 fine-selection apertures (see inset B). The obstruction plate 10b carries a pattern of dummy electrodes 14, 14', . . . on its screen-sided surface. The other surface of obstruction plate 10b adjoins a spacer plate 103. In this case spacer plate 103 is provided with a pattern of slot-shaped apertures 104, 104', . . . In this case gauze strips 143a, 143b, . . . extend across the slot-shaped apertures 104, 104', . . . at the lower side of the spacer plate 103. The gauze strips 143a, 143b, . . . constitute preselection electrodes and adjoin the electron transport ducts 11, 11', . . . where they form extraction locations. Electrons are injected into the transport duets, for example, in the manner described with reference to FIG. 13.

A method of providing the large numbers of apertures in the plates is, for example, to manufacture the plates of photosensitive glass, expose the plates via a pattern and etch the exposed parts.

An alternative possibility of arranging the system of plates in a box, as is shown in FIG. 10, is to stack the plates and cement them together along the rims. A synthetic resin sealing rim may be provided around the assembly.

An oblique landing electrode (FIG. 13) may be used in a mode in which entering electrons impinge upon it, as well as in a mode in which entering electrodes are repelled (by applying a negative voltage), into the transport duct.

The flu-spacer plate 101 in FIGS. 1 and 2 may have such an apertured pattern that each flu-spacer aperture connects one fine-selection aperture with one pixel on the luminescent screen. In that case an optimum colour purity is guaranteed. However, it is alternatively possible to form the aperture pattern in such a way that each flu-spacer aperture connects at least two fine-selection apertures with at least two pixels. (This reduces the risk of breakdown. A tapered aperture shape may also be advantageous in this respect.)

The stepped selection structure has been described hereinbefore in relation to colour selection. However, the stepped selection structure can also be used to advantage for a screen luminescing in one colour, in that case for obtaining a high resolution with a minimum number of drive circuits.

It is to be noted that, in principle, the length of the electron transport ducts or the number of juxtaposed transport ducts is unimportant for the picture quality. Any aspect ratio for a display screen having a short axis and a long axis is thus possible, for example 4:3; 14:9; 16:9. The electron transport ducts are generally arranged parallel to the short display screen axis, but in some cases it may be advantageous to arrange them parallel to the long axis.

A problem may occur when the aspect ratios of the relevant displays are increased, because the required transport voltage increases accordingly and may (consequently) become very large. Since the dummy electrodes are interconnected and have a DC potential which is a few hundred Volts higher than the value of the highest coarse-selection electrode, there is a large potential difference between the dummies and the lower coarse-selection strips. Then there is the risk that field emission occurs from these coarse-selection electrodes to the dummies, which may cause fluctuating light spots in the picture.

The proposed solution to the above-mentioned problem is to make use of an extra plate in the active selection system, preferably in the form of two sub-plates, one having a pattern of large-diameter apertures ("spacer plate") and the other having a pattern of small-diameter apertures which can, however, be combined in one structure.

There are 2 possibilities.

1. An extra (intermediate) selection plate (in this case a plate 10d having apertures 208 and an associated pattern of selection electrodes 213, combined with an intermediate selection spacer 10d'), arranged between the obstruction plate 10b and the fine-selection spacer 102; see FIG. 16. The intermediate selection may then be performed, for example, in twos (FIG. 16) or in fours and in the "interconnected" form, i.e. there are 2 and 4 extra connections, respectively. With the pitch of the pixels remaining the same, this provides the possibility of giving the electron transport ducts a width which is, for example, twice as large as in an embodiment without an intermediate selection plate, so that the required transport voltage is halved. In addition, there are the following advantages:

half the number of cathode sections and column drivers;

lower energy dissipation;

the number of coarse-selection electrodes is halved in the case of intermediate selection in fours.

A drawback is that the cathode drivers should be (twice) faster.

Figure 17:
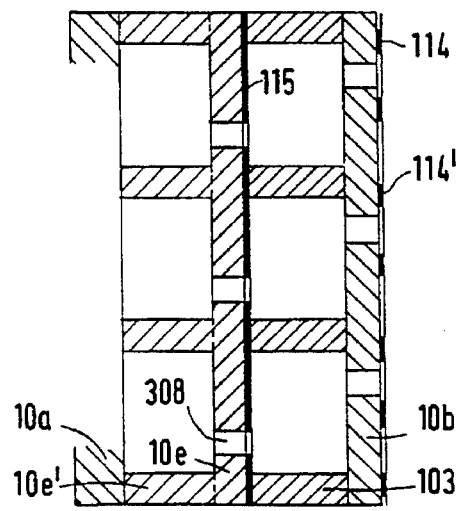
FIG. 17 is a cross-section of a part of the active selection structure of a device of the type shown in FIG. 1, provided with an extra aperture plate for decreasing the transport voltage.

A solution in which the cathode driver speed need not be increased is:

2. an extra, voltage-reducing, plate (in this case a plate 10e having apertures 308, combined with a spacer 10e'; in other words, the device is provided with a double obstruction plate) arranged between the coarse-selection structure 10a and the obstruction plate 10b, whose "rear" side is provided with suitable voltage-reducing means; see FIG. 17. The voltage-reducing means may be constituted by a layer of resistance material 115 connected to a voltage source at the lower and upper sides, or by a pattern of (parallel) metal tracks connected to voltage-dividing resistors across which a voltage is applied. The resistance layer is given, for example, half the transport voltage so that the transport voltage across the ducts may be twice as large as in the original case. An additional advantage with respect to the solution described above is the simple construction (a pattern of selection electrodes is not necessary).

Figure 16:
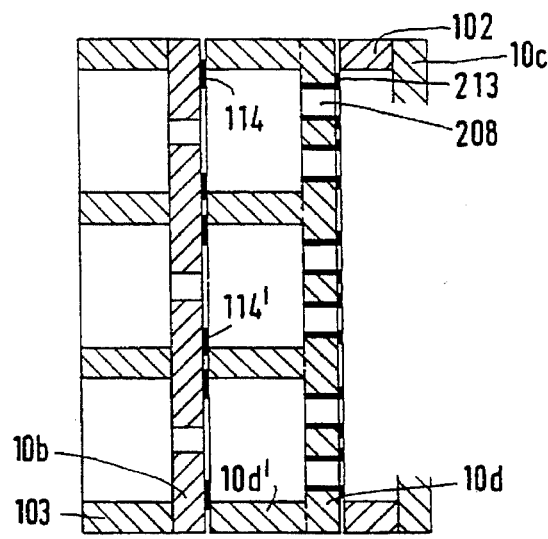
FIG. 16 is a cross-section of a part of the active selection structure of a device of the type shown in FIG. 1, provided with an extra intermediate selection plate.

It is to be noted that the screen-sided surface of the obstruction plate 10b has a pattern of dummy electrodes 114, 114' in FIGS. 16 and 17. This pattern is comparable to the pattern 14, 14' in FIG. 4. A similar pattern is denoted by the reference numerals 214, 214' in FIG. 13. The solutions described above are also applicable in devices without an obstruction plate. A further method of preventing the required transport voltages in the relevant displays from becoming too large when the aspect ratios are increased is, for example, to localize the row of electron emitters at half the height in the display (as in FIG. 13) instead of on the bottom (as in FIG. 1). However, it appears to be difficult to obtain a uniform picture quality with such an arrangement. The measures mentioned above provide the possibility of manufacturing a display of large dimensions, in which the required transport voltages are not too large, while the row of electron emitters may be arranged proximate to the lower (or upper) side of the display screen.

We claim:

1. A picture display device having a vacuum envelope which is provided with a transparent face plate with a luminescent screen and with a rear wall, said display device comprising a plurality of juxtaposed sources for emitting electrons, a plurality of electron transport ducts cooperating with the sources and extending substantially parallel to the face plate for transporting said electrons in the form of electron currents, and an active selection structure for withdrawing each electron current at predetermined locations from its transport duct and for directing said current towards desired pixels of the luminescent screen, characterized in that the active selection structure comprises a preselection structure having extraction locations which can be activated and communicate row by row with the transport ducts and a selection plate having apertures which can be activated and are each associated with a pixel, and in that an apertured obstruction plate is arranged between the preselection structure and the selection plate, each aperture of the obstruction plate communicating with an activatable extraction location of the preselection structure and at least two activatable apertures of the selection plate.

2. A device as claimed in claim 1, characterized in that the extraction locations and the activatable apertures, respectively are associated row by row with strip-shaped preselection electrodes which are connected to a circuit for applying, in operation, preselection voltages thereto, and with selection electrodes which are connected to a circuit for applying, in operation, selection voltages thereto, respectively.

3. A device as claimed in claim 2, characterized in that the obstruction plate is spaced apart from the selection plate by an apertured spacer plate, each aperture of the spacer plate associating an aperture of the obstruction plate with at least two activatable apertures in the selection plate, while dummy electrodes are arranged along the electron paths between the apertures in the obstruction plate and the apertures in the selection plate, said dummy electrodes being connected to a circuit for applying, in operation, a higher DC voltage to said electrodes than to non-selected selection electrodes.

4. A device as claimed in claim 2, characterized in that the selection electrodes are connected to a circuit for applying, in operation, a higher DC voltage to said electrodes than to the preselection electrodes.

5. A device as claimed in claim 2, characterized in that the selection electrodes are connected to a circuit for energizing said electrodes with the same bias voltage.

6. A device as claimed in claim 5, characterized in that the selection electrodes are directly DC interconnected in groups.

7. A device as claimed in claim 3, characterized in that the dummy electrodes are connected to a circuit for energizing said electrodes with the same DC bias voltage.

8. A device as claimed in claim 7, characterized in that the dummy electrodes are directly DC interconnected in groups.

9. A device as claimed in claim 1, characterized in that an aperture intermediate selection plate is arranged between the obstruction plate and the selection plate, thus constituting a stepped, threefold selection structure.

10. A device as claimed in claim 1, characterized in that an apertured plate provided with voltage-reducing means is arranged between the obstruction plate and the preselection structure.

11. A display device comprising a luminescent screen and means for selectively energizing predetermined areas of said screen, said means comprising at least one electron transport duct, means for promoting propagation of electrons within the at least one transport duct, and selection means for selectively extracting electrons from the at least one electron transport duct at predetermined locations and directing said extracted electrons toward the predetermined areas of the screen, said selection means comprising:

a. a preselection structure for selectively extracting the electrons from the at least one transport duct at the predetermined locations;

b. a selection structure having a multiplicity of apertures communicating with respective ones of the predetermined areas of the screen; and c. an obstruction structure disposed between the preselection structure and the selection structure and including a plurality of apertures through which respective ones of the predetermined locations communicate with respective pluralities of the apertures in the selection structure, said plurality of apertures being arranged such that no direct-line paths exist between the predetermined locations and the respective pluralities of apertures in the selection structure.

12. A display device as in claim 11 where the preselection structure comprises a plate having apertures at the predetermined locations in communication with the at least one transport duct.

13. A display device as in claim 12 where the preselection structure plate comprises a wall of the at least one electron transport duct.

14. A display device as in claim 11 where the preselection structure comprises a plate having electron extraction apertures at the predetermined locations in communication with the at least one electron transport duct through a gauze material.

* * * * *

UNITED STATES PATENT AND TRADEMARK OFFICE
CERTIFICATE OF CORRECTION

PATENT NO. : 5,625,253
DATED : Apr. 29, 1997
INVENTOR(S) : Van Gorkom et al.

It is certified that error appears in the above-identified patent and that said Letters Patent is hereby corrected as shown below:

Column 14, line 7, Claim 9, line 2 change "aperture" to "apertured".

Signed and Sealed this

Thirty-first Day of March, 1998

*Attest:*

BRUCE LEHMAN

*Attesting Officer*     *Commissioner of Patents and Trademarks*